United States Patent
Wheeler et al.

(10) Patent No.: US 8,788,630 B2
(45) Date of Patent: Jul. 22, 2014

(54) SYSTEM AND METHOD FOR PROXY ADDRESS NEUTRALITY

(75) Inventors: Thomas T. Wheeler, Frisco, TX (US); Robert W. Peterson, Plano, TX (US); Qin Ye, Plano, TX (US)

(73) Assignee: Open Invention Network, LLC, Durham, NC (US)

( * ) Notice: Subject to any disclaimer, the term of this patent is extended or adjusted under 35 U.S.C. 154(b) by 247 days.

(21) Appl. No.: 13/078,944

(22) Filed: Apr. 2, 2011

(65) Prior Publication Data

US 2012/0254374 A1    Oct. 4, 2012

(51) Int. Cl.
*G06F 15/177* (2006.01)

(52) U.S. Cl.
USPC ............ 709/220; 709/221; 709/224; 455/507

(58) Field of Classification Search
USPC ........................... 709/220, 221, 224; 455/507
See application file for complete search history.

(56) References Cited

U.S. PATENT DOCUMENTS

| | | | | |
|---|---|---|---|---|
| 6,101,528 | A * | 8/2000 | Butt | 709/203 |
| 7,400,897 | B2 * | 7/2008 | Lazaridis | 455/507 |
| 2002/0038371 | A1 * | 3/2002 | Spacey | 709/227 |
| 2003/0065756 | A1 * | 4/2003 | Carrez | 709/221 |
| 2004/0179537 | A1 * | 9/2004 | Boyd et al. | 370/395.54 |
| 2005/0138173 | A1 * | 6/2005 | Ha et al. | 709/225 |
| 2006/0161975 | A1 * | 7/2006 | Diez et al. | 726/18 |
| 2006/0253558 | A1 * | 11/2006 | Acree et al. | 709/220 |
| 2010/0177754 | A1 * | 7/2010 | Emond et al. | 370/338 |
| 2011/0055374 | A1 * | 3/2011 | Christenson et al. | 709/224 |
| 2011/0282934 | A1 * | 11/2011 | Chalana et al. | 709/203 |

* cited by examiner

*Primary Examiner* — Ario Etienne
*Assistant Examiner* — Michael C Lai
(74) *Attorney, Agent, or Firm* — Haynes and Boone, LLP

(57) ABSTRACT

To provide proxy address neutrality, in particular for mobile server devices, a server application can register its network address with a discovery application. Whenever the server application acquires a new network address, the server application updates the discovery application. A client application providing proxy services for the server application can invoke calls to the server client using the network address for the server application that is currently stored in the client device. If the current network address is invalid, the client application obtains an updated network address from the discovery application.

13 Claims, 5 Drawing Sheets

SYSTEM AND METHOD FOR PROXY ADDRESS NEUTRALITY

FIELD OF THE INVENTION

This disclosure relates to distributed computing applications and in particular to the use of proxies in distributed computing environments.

BACKGROUND OF THE INVENTION

In a distributed computing application, the proxy pattern is commonly used to represent software services running on another device. The proxy typically contains the network address of the device, which is necessary to communicate with that service. Modern mobile devices support multiple means for connecting to the Internet, e.g. WiFi, WiMAX, 3G, 4G, etc. In addition, their network address is subject to change with high frequency in comparison to more stationary devices such as servers and desktop computers. When a device's network address changes, any remote proxies that have the device's old address will no longer be usable. The application must update all proxies to contain the new address.

The application developer is normally responsible for handling proxies that become invalid. Each proxy in use must be recreated or updated to use the new network address of the service it is a proxy to. This process is error-prone and places a burden on the application developer to ensure all proxies have been updated.

What is required is an improved system and method for providing proxies in distributed computing applications.

SUMMARY OF THE INVENTION

To provide proxy address neutrality, in particular for mobile server devices, a server application can register its network address with a discovery application. Whenever the server application acquires a new network address, the server application updates the discovery application. A client application providing proxy services for the server application can invoke calls to the server client using the network address for the server application that is currently stored in the client device. If the current network address is invalid, the client application obtains an updated network address from the discovery application.

In one aspect of the disclosure, there is provided a method for providing a proxy service. A client application may invoke a remote call from a proxy service of the client application to a service of a server application using a network address obtained from the client application. If the network address is not valid, the client application may retrieve an updated network address from a discovery application and perform the remote call using the updated network address.

In one aspect of the disclosure, there is provided a server application that executes on a server device. The server application may be configured to generate a server context for one or more services. The server context may comprise a unique identifier and a network address, which are registered with a discovery application. When the server application acquires a new network address, the new network address is registered with the discovery application for the one or more services.

In one aspect of the disclosure, there is provided a system for providing proxy address neutrality comprising a discovery application, a server device and at least one client device. The server device may comprise a network address and may execute at least one server application. The server application may comprise a server context configured to register the network address with the discovery application, and at least one server service. The client device may execute a client application comprising a client context and at least one proxy service to the at least one server service. The client context may be configured to retrieve the network address from the discovery application.

BRIEF DESCRIPTION OF THE DRAWINGS

Reference will now be made, by way of example only, to specific embodiments and to the accompanying drawings in which.

DETAILED DESCRIPTION OF THE INVENTION

As will be apparent from the following, the system to be described below provides a means by which all proxies for a service or services hosted remotely can be updated without programmer intervention to use a new address when the remote device's network address changes. The system can be used to provide Proxy address neutrality for improved service reliability in distributed applications.

Figure 1:
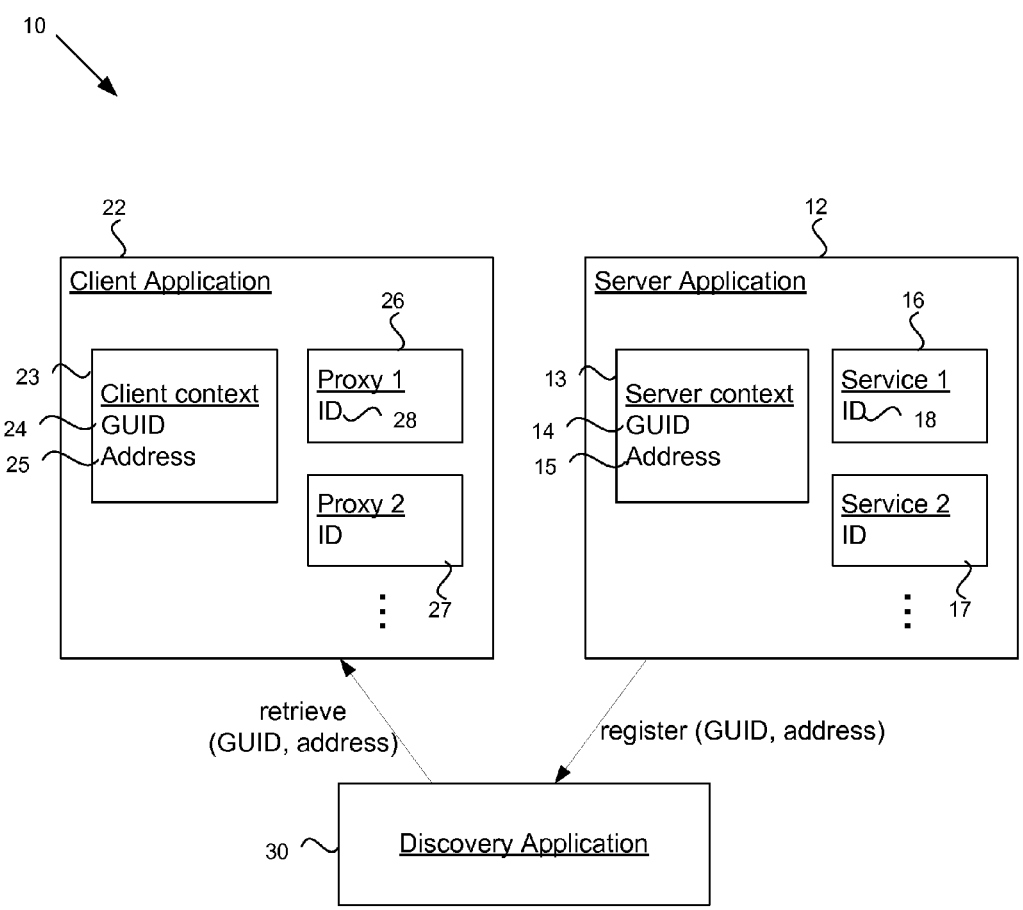
FIG. 1 shows a system for providing proxy address neutrality.
Figure 2:
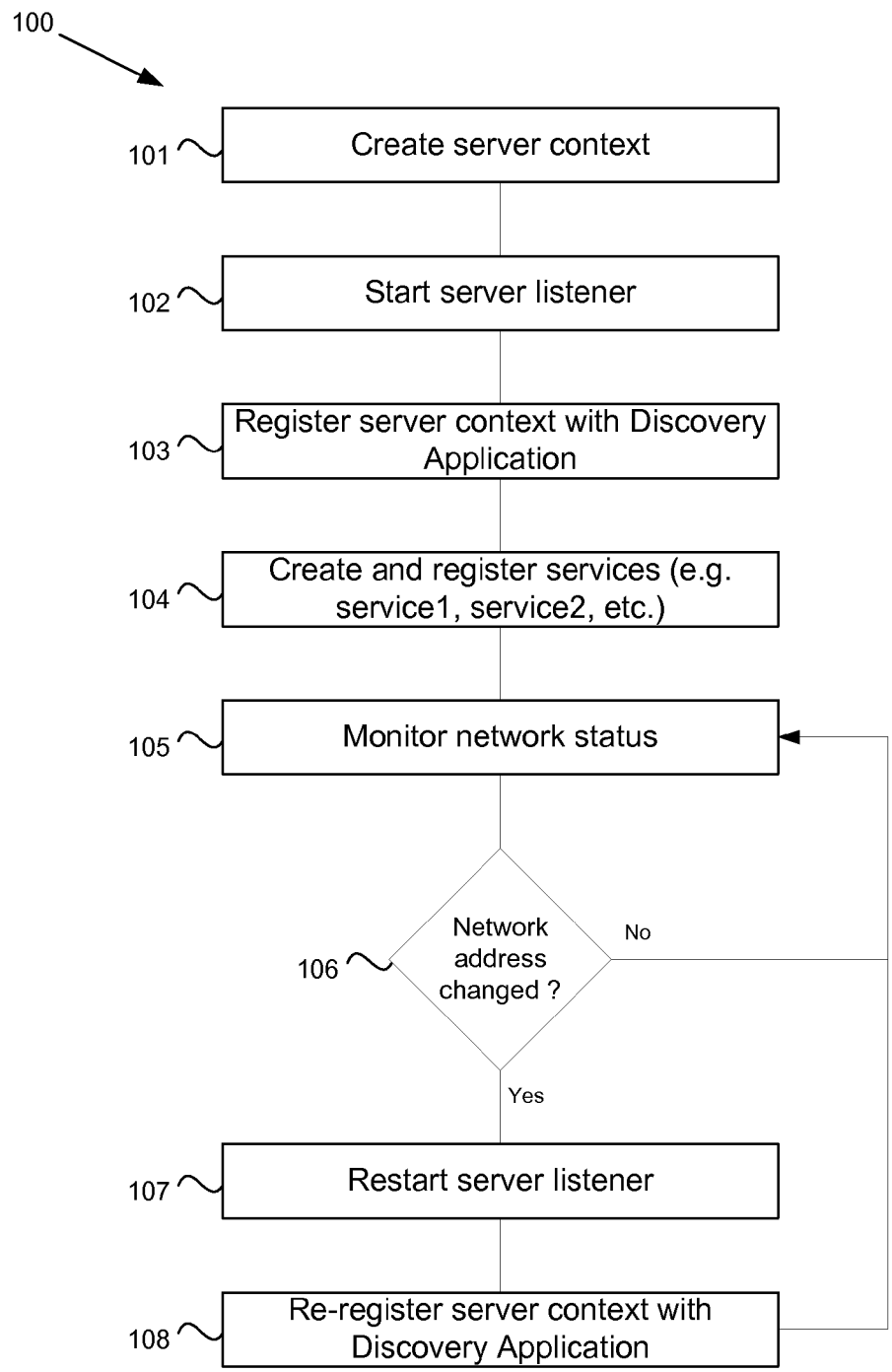
FIG. 2 shows a method for executing a server application.

An embodiment of the system is depicted in FIG. 1. The system 10 includes a server application 12 which creates a server context 13 that has a unique identity (GUID) 14. A method of operation of the server application 12 is shown in the flowchart 100 of FIG. 2. At step 101, the server application creates the server context 13, which starts a server listener (step 102) that receives and processes communications from client applications. The server listener opens a server socket on a designated network address 15 associated with the server device. The server application 12 registers the server context 13 with a discovery application 30 (step 103). The registration information includes at least the server listener's network address 15 and server context GUID 14.

Figure 3:
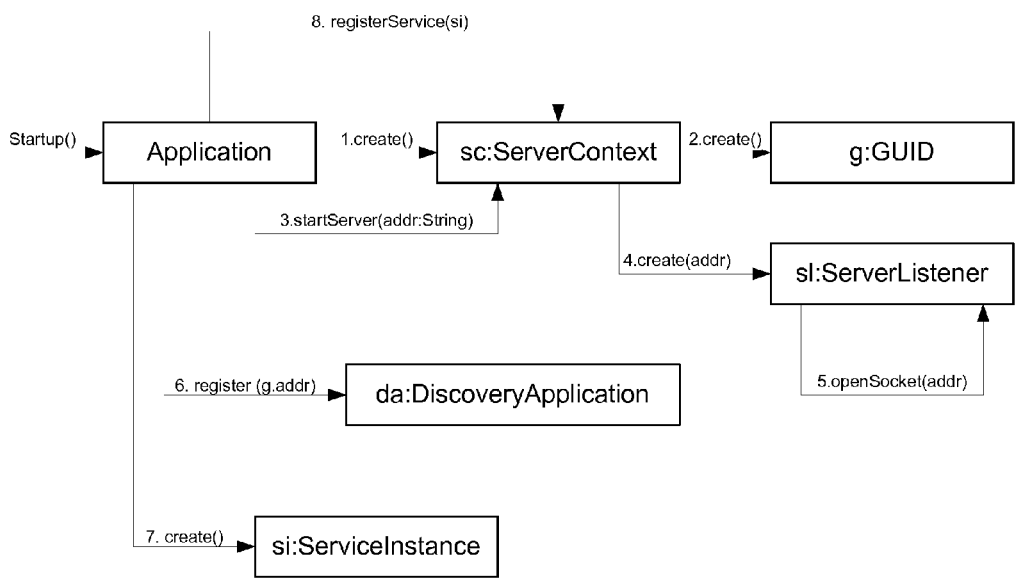
FIG. 3 shows the message flows when establishing a server context.

The server application 12 creates one or more services (step 104), e.g. Service1 16, Service2 17, etc. and registers them with the server context 13. Each service has a unique service identifier (ID). The message flows for initializing the server application (steps 101 to 104) are depicted in FIG. 3.

Figure 4:
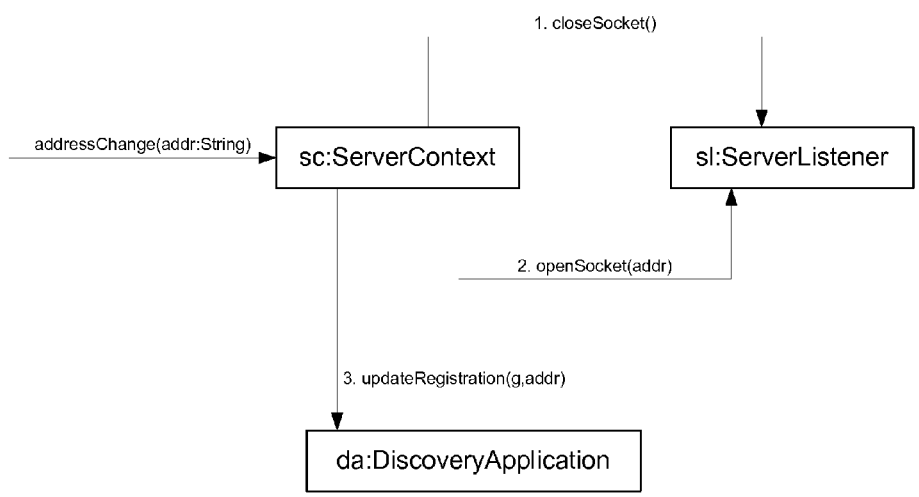
FIG. 4 shows the message flows for updating a network address of the server context.

The server then proceeds to monitor the network status (step 105). If the device hosting the service changes its network address 15 (determination 106), the server context 13 restarts the server listener (step 107) and re-registers with the discovery application to include the new network address (step 108). The message flows for re-registering the network address (steps 106 to 108) are depicted in FIG. 4.

Figure 5:
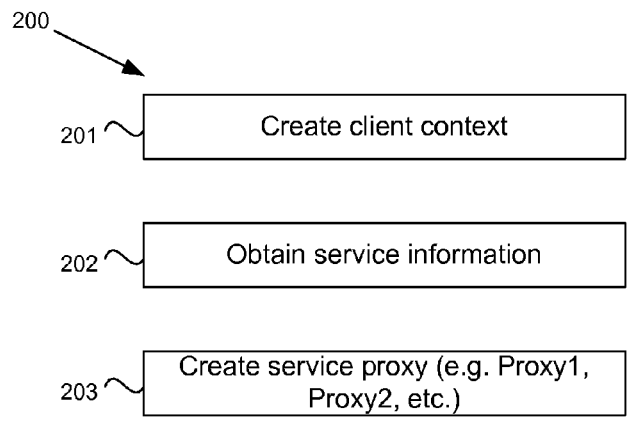
FIG. 5 shows a method for establishing a client context.
Figure 6:
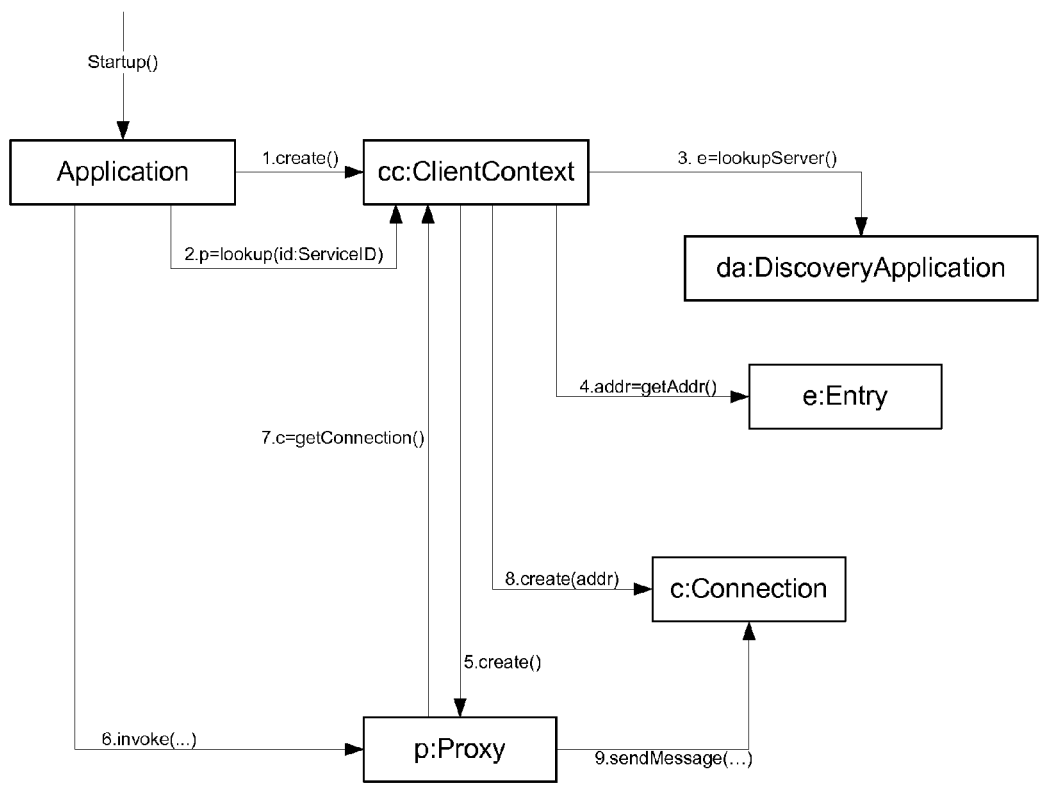
FIG. 6 shows the message flows for establishing the client context.

The system 10 also includes one or more client applications 22. The client application is initialized following the procedure depicted in the flowchart 200 of FIG. 5. The message flows of the procedure 200 are depicted in FIG. 6. The client application 22 creates a client context 23 (step 201). The client context 23 is a client logical representation for a remote server context 13. The client context 23 uses the discovery application 30 to retrieve the information necessary to create a proxy to a service (e.g. Service_1 16, Service_2 17), including the server context GUID 14, server context network address 15, and service identifier 18 for the remote service (step 202). The client context retains a local copy of the server context GUID 24 and network address 25. The client context 23 creates a proxy to the service (e.g. Proxy_1 26, Proxy_2 27, etc.) (step 203). The proxy 26, 27 has a reference to the client context 23. Each proxy for a service hosted in a given server application server context references the same client context object.

The discovery application 30 is accessible via the network by both the server application and client application. It contains entries describing server contexts. Each entry includes at least the server context's unique GUID and one network address for the server context. Entries may also include additional information required by the client application to determine which server context is the most appropriate to use, or information required by the discovery application to properly resolve a server context when a client performs a discovery request. The discovery application runs on a system with a stable network address, to ensure reliable connectivity by both server application and client application. It establishes a listener on an address/port that is known to the server application and client application. The server application connects to the discovery application to register server contexts. The client application connects to the discovery application to obtain the network address for a server context. The exact mechanism for obtaining a server context will vary. Examples include:

A client provides a well-known server context name to the discovery application to obtain its network address. In this implementation, when a server application registers a server context with the discovery application, it provides the discovery application with the name of the server context. The discovery application can then associate the name to the registration of the server context, and look up the registration when the client provides the name;

A client provides a description of a service to the discovery application to obtain the network address of a server context that hosts the service. In this implementation, when a server application registers a service with the server context, the server context provides the discovery application a description of the service. The description may consist of a set of attributes consisting of name-value pairs. The discovery application can then associate the service description to the server context registration, and look up the registration when the client provides a service description by matching the requested description to the description registered.

A client provides a server context GUID to the discovery application to obtain the server context's network address. In this implementation, the client must have a priori knowledge of the server context GUID: typically, either the GUID is well-known to both server application and client application, or, the client application obtained the GUID from the discovery application through a previous lookup using another discovery request mechanism.

Other examples will be apparent to a person skilled in the art and all such examples are intended to be encompassed herein.

Figure 7:
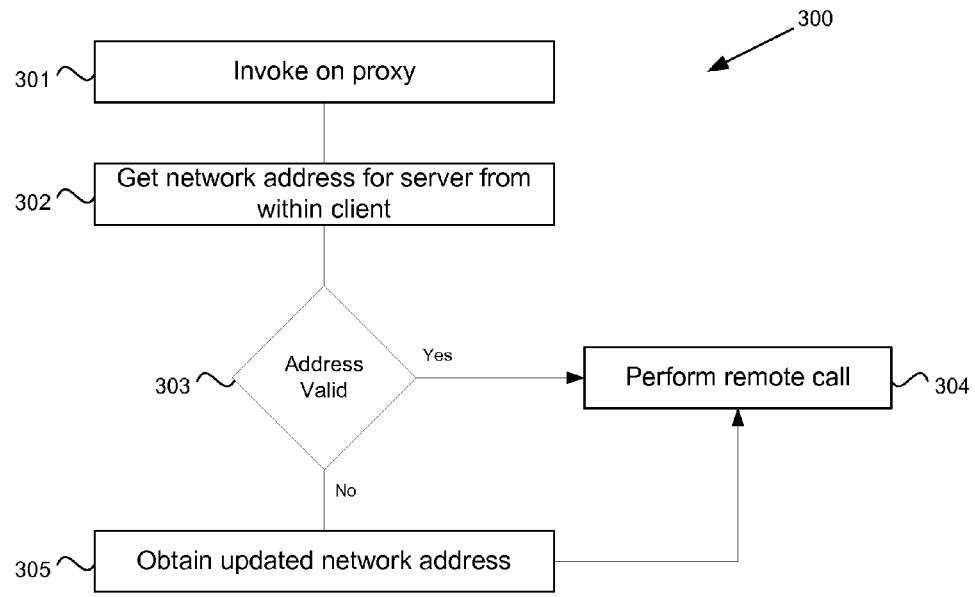
FIG. 7 shows a method for performing a remote call from the client context.
Figure 8:
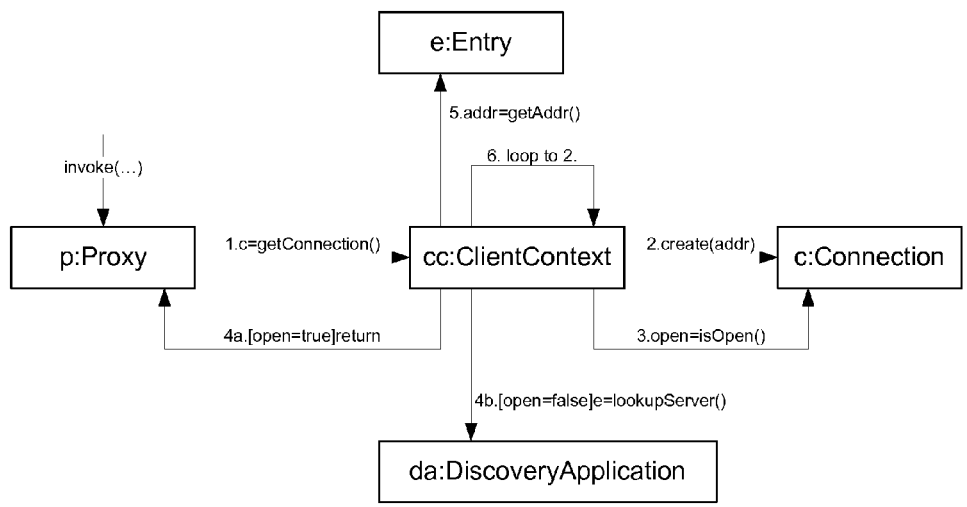
FIG. 8 shows the message flows for performing the remote call.

A process for using the proxy service will now be described with reference to the flowchart 300 of FIG. 7. When a client application proxy 26, 27 invokes a remote call on the service 16, 17 (step 301), the client context obtains the locally stored network address 25 for the server context 13 (step 302) and attempts to establish a network connection to the server application's 12 server listener using the current network address 25. If the network connection is successfully established and the service is available on the server context as identified by the server context GUID and service ID, the network address is valid; otherwise, if the connection could not be established or the service is unavailable or the server context does not exist, the address is invalid (determination step 303). If the network address is valid, the remote call is performed (step 304). However, if the network address is no longer valid for that service, the relevant client context 23 attempts to re-discover the service by performing a discovery request using the discovery application 30. The client context 23 retrieves the server listener's new network address using the discovery application 30 (step 305), stores the updated server context GUID and address locally, and performs the call (step 304) using the updated address. Since all proxies reference the client context in this fashion, each proxy automatically has its service's new network address via the updated client context.

The above described systems and methods may be implemented as part of a software library for general purpose use by distributed applications running in mobile devices. The invention may be a stand-alone library or provided as part of a larger product such as a web browser client library, Web Services library, or RPC/ORB library.

The components of the system 10 may be embodied in hardware, software, firmware or a combination of hardware, software and/or firmware. The server, client and discovery application devices may each comprises one or more processors that are each operatively associated with one or more memories that store executable instructions for implementing the methods described above.

The described proxy updating methods benefit developers implementing distributed applications by reducing the effort needed to manage and maintain proxies. Since proxies are updated automatically, the chance of error is reduced, and the maintenance burden is also reduced. Advantages of these embodiments include the reduction of programmer effort, allowing a device's services to be accessed remotely more reliably when the device's network address is changed, and reducing errors in updating proxy addresses, thus making applications more reliable.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for providing a proxy service for a distributed application comprising at least one client application, at least one server application and at least one discovery application having a stable network address, the method comprising:
   distributing the distributed application comprising:
      establishing the at least one client application on a first mobile device;
      establishing the at least one server application on a second mobile device;
      establishing the at least one discovery application on a third device; and
      configuring the at least one client application and the at least one server application with the stable network address of the at least one discovery application;
   establishing, by the at least one server application, a server context for at least one service of the at least one server application at the second mobile device;
   establishing, by the at least one client application, a client context at the first mobile device as a proxy for the server context at the second mobile device;
   performing a remote call from a proxy service of the at least one client application to a service of the at least one server application executing on the second mobile device;
   obtaining a network address for a server from the at least one client application;
   determining if the network address is valid;
   if the network address is not valid, retrieving an updated network address from the at least one discovery application; and
   performing the remote call using the updated network address.

2. The method of claim 1, wherein the client context comprising the proxy service, the client context storing a network address of the server context.

3. The method of claim 1, further comprising:
   generating a unique identifier for the server context; and
   registering the unique identifier and the network address of the server with the at least one discovery application.

4. The method of claim 3, further comprising:
   acquiring a new network address for the server context; and
   registering the new network address with the at least one discovery application in response to acquiring the new network address.

5. The method of claim 1, further comprising establishing a communication between the at least one client application and the at least one server application using the updated network address.

6. A mobile server device that receives network service through a mobile communications network, the mobile server device comprising:
   at least one processor and an operatively associated memory, the at least one processor configured to execute a server application of a distributed application comprising the server application, a client application and a discovery application having a stable network address, the server application configured to:
   generate a server context for one or more services, the server context comprising a unique identifier and a network address;
   register the unique identifier and the network address with the discovery application;
   register the one or more services with the discovery application;
   acquire a new network address;
   register the new network address with the discovery application for the one or more services; and
   register at least one of a server context name and a service description with the discovery application.

7. The mobile server device of claim 6, further configured to establish a communication with a proxy client using the network address.

8. A system for providing proxy address neutrality, comprising:
   a discovery application of a distributed application, wherein the discovery application has a stable network address and at least one server application and a client application are each configured with the stable network address of the discovery application;
   a server device comprising at least one server processor and an operatively associated server memory, the at least one server processor configured to execute the at least one server application of the distributed application, the at least one server application comprising:
      a server context comprising a network address and configured to register the network address with the discovery application; and
      at least one server service; and
   at least one client device comprising at least one client processor and an operatively associated client memory, the at least one client processor configured to execute the client application of the distributed application, the client application comprising:
      a client context; and
      at least one proxy service of the at least one server service;
   wherein the client context is configured to:
   retrieve the network address from the discovery application;
   perform a remote call from at least one proxy service to the at least one server service;
   obtain a network address for a server of the at least one server service from within the client context;
   determine if the network address for the server is valid;
   if the network address for the server is not valid, retrieve an updated network address from the discovery application; and
   perform the remote call using the updated network address.

9. The system of claim 8, wherein the at least one server application is further configured to re-register an updated network address with the discovery application in response to the server device acquiring a new network address.

10. The system of claim 8, wherein the server device is a mobile device.

11. The system of claim 8, wherein the at least one server application is further configured to:
   establish the server context;
   generate a unique identifier for the server context; and
   register the unique identifier and the network address with the discovery application.

12. The system of claim 8, wherein the discovery application stores a server context name, and is further configured to provide the network address of the server context to the client application based on a query from the client application that indicates the server context name.

13. The system of claim 8, wherein the discovery application stores a service description of the server context, and is further configured to provide the network address of the server context to the client application based on a query from the client application that indicates the service description.

* * * * *